United States Patent [19]

Wössner

[11] Patent Number: 4,960,188

[45] Date of Patent: Oct. 2, 1990

[54] SINGLE-TUBE VIBRATION DAMPER OF VARIABLE DAMPING FORCE

[75] Inventor: Felix Wössner, Schweinfurt, Fed. Rep. of Germany

[73] Assignee: Fichtel & Sachs AG, Schweinfurt, Fed. Rep. of Germany

[21] Appl. No.: 405,748

[22] Filed: Sep. 11, 1989

[30] Foreign Application Priority Data

Sep. 17, 1988 [DE] Fed. Rep. of Germany ....... 3831718

[51] Int. Cl.⁵ ............................................. F16F 9/346
[52] U.S. Cl. .................................. 188/299; 188/322.19; 280/707
[58] Field of Search ............... 188/286, 299, 313, 315, 188/322.19; 267/218; 280/707

[56] References Cited

U.S. PATENT DOCUMENTS

| | | | |
|---|---|---|---|
| 725,456 | 4/1903 | Lemp | 188/299 |
| 2,036,623 | 4/1936 | Focht | 188/315 |
| 4,162,062 | 7/1979 | Strauss | 267/225 |

FOREIGN PATENT DOCUMENTS

| | | |
|---|---|---|
| 3434877 | 4/1988 | Fed. Rep. of Germany . |
| 2596124 | 9/1987 | France . |
| 0030541 | 2/1983 | Japan .................................. 188/299 |
| 806307 | 12/1958 | United Kingdom ................ 188/299 |
| 1242804 | 8/1971 | United Kingdom ................ 188/299 |
| 2164723 | 3/1986 | United Kingdom . |

Primary Examiner—Duane A. Reger
Attorney, Agent, or Firm—Toren, McGeady & Associates

[57] ABSTRACT

The invention provides a single-tube vibration damper of variable damping force which consists of simple and easily produced components and permits problem-free assembly. This is achieved in that the cylinder comprises an open cylinder end provided with the cylinder diameter and is arranged therewith on the side remote from the piston rod exit in the container. The inflow passages for a damping device externally fitted on the container are formed by an annular space present between cylinder and container and divided by means of seal.

5 Claims, 2 Drawing Sheets

SINGLE-TUBE VIBRATION DAMPER OF VARIABLE DAMPING FORCE

BACKGROUND OF THE INVENTION

Such a single-tube vibration damper is known from DE-Pat. No. 3,434,877, where working chambers separated by the damper piston are in communication with a magnetically operable damper device arranged parallel with the damper piston. A compensation chamber provided with a gas filling under pressure is separated by a separator piston from the damping-fluid-filled working chamber. For the connection of the damper device with the working chambers, openings are provided in the cylinder, while a passage between the cylinder and the container is connected for the one part with the damper device and for another part with a working chamber. In the cylinder there is also situated a stop for the separator piston. The stop is formed by a wire ring arranged in a groove of the cylinder. In this design it is disadvantageous that in the fitting of the separator piston the latter must be pushed with the seal over the openings of the cylinder and over the cylinder groove serving for the reception of the wire stop ring. Thus in the assembly of the separator piston it is easily possible for damage to the sealing edge to take place, whereupon a satisfactory seal between the working chamber and the compensating chamber is no longer guaranteed. It is also disadvantageous that the stop ring, or the valve housing part protruding into the working cylinder and comprising the passage, considerably shorten the stroke of the vibration damper.

It is the problem of the present invention to produce a single-tube vibration damper of variable damping force which consists of simple components which are easy to produce, and permits problem-free fitting.

SUMMARY OF THE INVENTION

In accordance with the invention this problem is solved in that the cylinder comprises an open end provided with the cylinder diameter, which end is arranged in the container on the side remote from the piston rod exit, while the feed passages are connectable by way of the damping device and are formed by an annular chamber divided by means of a seal, between cylinder and container. Thus it is possible in a simple manner for the separator piston to be introduced into the cylinder tube from the side remote from the piston rod, before the fitting of the cylinder into the container, and no radial openings or grooves of any kind of the cylinder tube have to be overrun in the fitting of the separator piston, so that damage to the sealing edge of the separator piston seal is avoided. The passages between the working chambers and the actuatable damper device acting parallel to the damper piston are also formed in a simple manner in that the annular space between cylinder and container is divided by means of a seal. This seal is advantageously secured on the outer wall of the cylinder and introduced together with the latter into the container.

In further development of the invention the cylinder comprises in the region of the open end a seal element which is arranged in sealing manner on the inner surface of the container. This sealing element can for example be formed by an adapter ring which comprises both a sealing ring co-operating with the inner wall of the cylinder and a further sealing ring which comes to abut in sealing manner on the inner surface of the container.

The adapter ring is pushed on to the cylinder likewise before the fitting of the cylinder in the container. According to a further feature of the invention a very simple embodiment of the sealing of the cylinder in the container is obtained in that the sealing element is formed by a sealing ring and is arranged in a groove of the cylinder.

In order not to have to push the sealing ring over the entire axial length of the inner wall of the container in the fitting of the cylinder in the container, the container has in the region of the sealing ring a step adapted to the end of the cylinder and provided with a junction face.

An easy and problem-free assembly especially of a damping device comprising two separately actuatable damping valves is obtained according to a further feature of the invention in that a connection plate is connected with the container.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
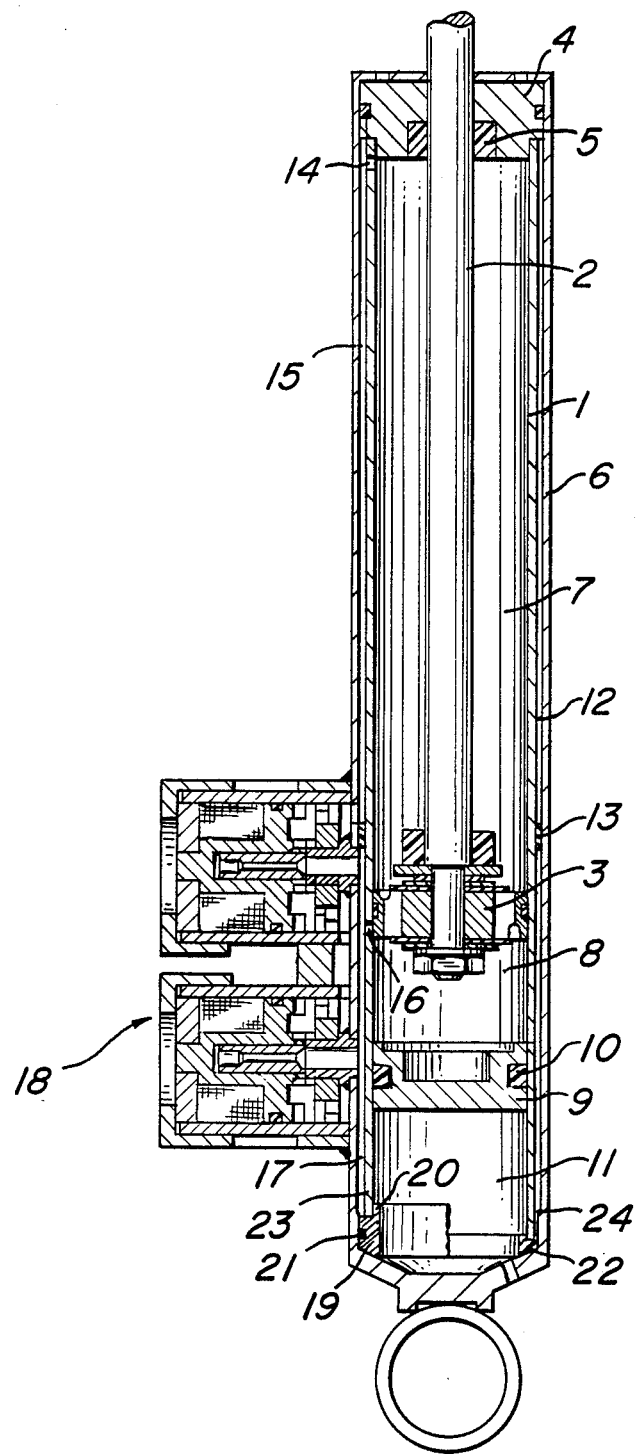
FIG. 1 shows a single-tube vibration damper in longitudinal section.

The single-tube vibration damper of variable damping force as shown in FIG. 1 consists of a cylinder 1 in which there slides a damper piston 3 provided with a piston rod 2. A damping-fluid-filled inner chamber of the cylinder 1 is divided by this damping piston 3 into a working chamber 7 above the damping piston and a working chamber 8 below the damping piston. A separator piston 9 comprises a separator piston seal 10 and slides on the inner wall of the cylinder 1, while a compensation chamber 11 possessing a gas filling under pressure is separated by this separator piston 9 from the working chamber 8. The piston rod 2 is guided outwardly axially movably by means of a piston rod guide 4, and sealed off by the piston rod seal 5. Between the outer wall of the cylinder 1 and the inner wall of the container 6 an annular space 12 is formed which is divided by means of a seal 13 into an upper inflow passage 15 and a lower inflow passage 17. The lower working chamber 8 is in fluid-conducting communication by way of an opening 16 situated in the 25. Cylinder 1 with the inflow passage 17, while the upper working chamber 7 is connected with the inflow passage 15 by way of an opening 14 arranged in the region of the piston rod guide 4 in the cylinder 1.

The inflow passages 15 and 17 are connectable with one another by way of the damping valves of the damping device 18. The cylinder 1 is centered and clamped in the container 6 between the bottom of the container 6 and the piston rod guide 4, the cylinder 1 being open at its container end 23 and having a seal between the compensating chamber 11 and the inflow passage 17. This seal is formed in the left half of FIG. 1 by a seal element 19 which rests with a sealing ring 20 on the inner wall of the cylinder 1 and seals with a sealing ring 21 on the inner wall of the container 6. In the right half of this FIGURE the cylinder 1 is provided with a shaped seal 22 which is pushed on to the cylinder 1 and also comes to rest on the bottom surface of the container 6. In assembly firstly the separator piston 9 is introduced into the cylinder 1 from the cylinder end 23 and then the seal element 19 or the shaped seal 22 is pushed on to the cylinder end 23. The cylinder 1 together with the sealing elements, including the seal 13, are now introduced into the container 6. For easy fitting and satisfactory centering of the cylinder 1, a joint face 24 is provided at the lower end of the container 6 and has the effect that the seal is pressed satisfactorily against the wall of the container 6.

Figure 2:
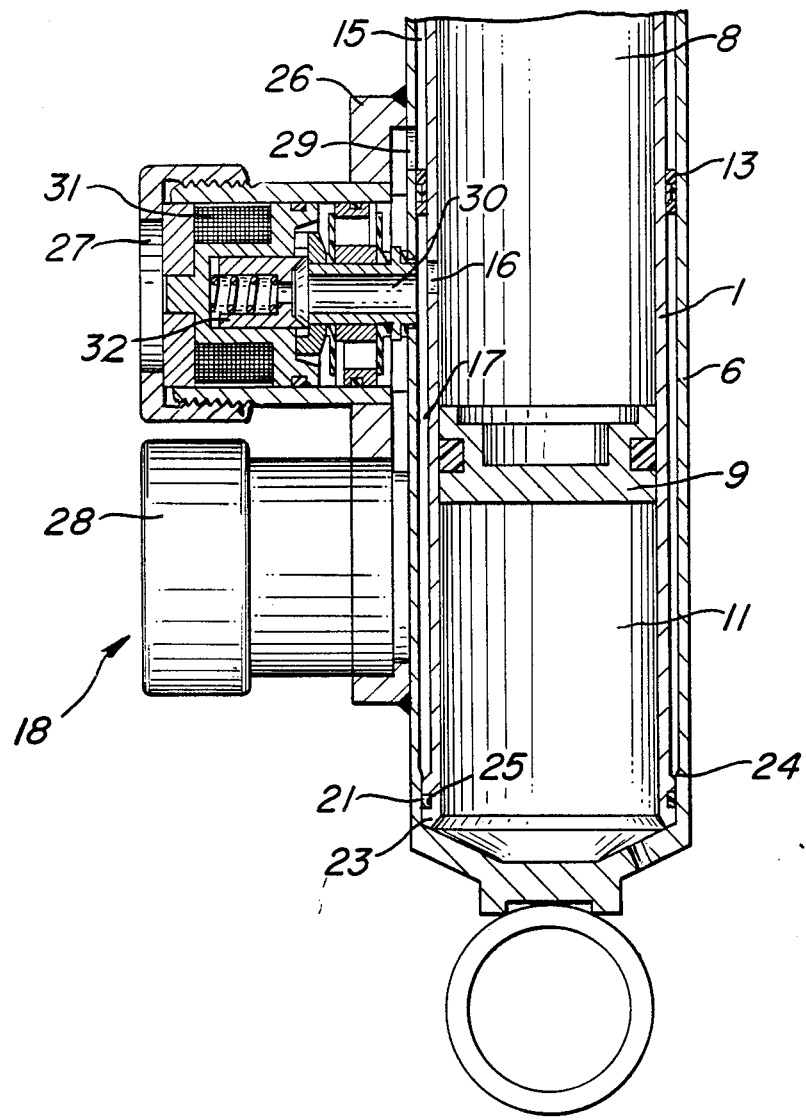
FIG. 2 shows a detail of a single-tube vibration damper in the region of the damping device, in longitudinal section.

A further development of the seal of the cylinder 1 in the container 6 is shown in FIG. 2, where the cylinder 1 is provided at its cylinder end 23 with a groove 25 into which the sealing ring 21 is laid and brought to abut on the inner wall of the container 6, by means of the joint face 24, in assembly. For the damping device 18 a connection plate 26 is brought on to the outer surface of the container 6 and tightly connected with the container 6 preferably by welding. The damping device 18 consists in the examples of the embodiment as shown, of the two damping valves 27 and 28 and the housings of the damping valves arranged pressure-tightly in the connection plate 26. By means of a screw connection, each damping valve is fastened in the housing so that the passage 30 opens into the inflow passage 17, while a bore 29 in the container 6 connects the inflow passage 15 with the damping valve chamber, the connection plate 26 forming a connection for the two damping valve chambers If an electro-magnet 31 of the damping valve 27 or 28 is energized, a valve body 32 is lifted away from its valve seat and the throughflow between the inflow passages 15 and 17 is rendered possible by way of the damping device of the damping valve 27 or 28. In this way with the two damping valves 27 and 28, by connection according to choice, it is possible to achieve different damping forces which are effective in parallel with the actual piston damping by the damping piston and thus effect a reduction of the damping force. The damping with the damping piston only is achieved when the two damping valves 27 and 28 are not energized, that is are closed.

While specific embodiments of the invention have been shown and described in detail to illustrate the application of the inventive principles, it will be understood that the invention may be embodied otherwise without departing from such principles.

What we claim is:

1. A single-tube vibration damper of variable damping force comprising:
   a cylinder (1) containing damping fluid, and having a first end and a second end (23), the second end (23) forming an opening having the diameter of the cylinder (1),
   a damping piston (3) slideably arranged in the cylinder (1) and separating the cylinder (1) into two working chambers (7, 8) each of which contains said damping fluid,
   a piston rod (2) connected to the damping piston (3), the piston rod (2) exiting the cylinder (1) at the first end thereof,
   means forming a gas chamber (11) which contains a gas filling under pressure,
   a separator piston (9) slideably arranged in the cylinder (1), the separator piston (9) being sealed to the cylinder (1),and separating the gas chamber (11) from the working chambers (7, 8) containing said damping fluid,
   a container (6) at least partially surrounding the cylinder (1) and forming an annular space (12) between the container (6) and the cylinder (1), controllable damping means (18) having damping fluid flow passages (15, 17) connecting the two working chambers (7, 8) through wall openings (14, 16) of the cylinder (1), said passages (15, 17) being formed by the annular space (12) between the container (6) and the cylinder (1) and a sealing (13) dividing the annular space (12) into two areas (15, 17) each of which is connected through at least one of the wall openings to one of the working chambers (7, 8).

2. A vibration damper according to claim 1, wherein the cylinder (1) comprises in the region of the second end (23) a sealing element (19, 21, 22) which is arranged in sealing manner on an inner surface of the container (16).

3. A vibration damper according to claim 2, wherein the sealing element (19, 21, 22) is formed by a sealing ring (21) and is arranged in a groove (25) of the cylinder (1).

4. A vibration damper according to claim 3, wherein the container (6) comprises in the region of the sealing ring (21) a step adapted to the end of the cylinder (1) and provided with a joint face (24).

5. A vibration damper according to claim 1, wherein with the container (6) there is connected a connection plate (26) in which said damper means (18) is arranged with two separately actuatable damping valves (27, 28) acting in the traction and compression directions.

* * * * *